No. 718,640. PATENTED JAN. 20, 1903.
P. K. LATHROP.
SEEDING MACHINE.
APPLICATION FILED OCT. 9, 1902.
NO MODEL.
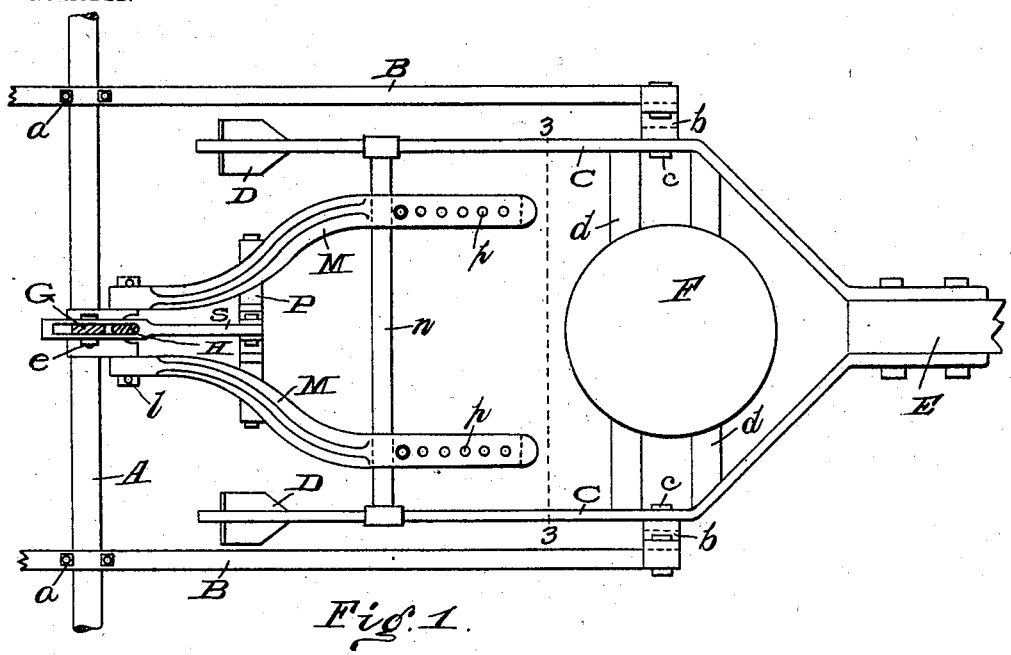
Fig. 1.
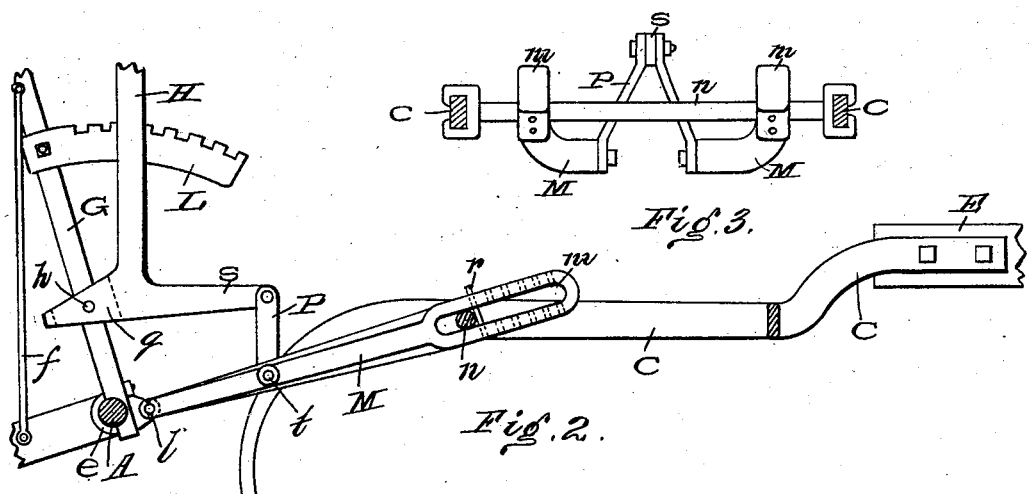
Fig. 3.
Fig. 2.
Witnesses
E. G. Leamer
Charles W. Hoffman
Inventor
Frank K. Lathrop
by Alfred M. Allen
Attorney

UNITED STATES PATENT OFFICE.

FRANK K. LATHROP, OF DAYTON, OHIO, ASSIGNOR TO THE OHIO RAKE COMPANY, OF DAYTON, OHIO, A CORPORATION OF OHIO.

SEEDING-MACHINE.

SPECIFICATION forming part of Letters Patent No. 718,640, dated January 20, 1903.

Application filed October 9, 1902. Serial No. 126,499. (No model.)

*To all whom it may concern:*

Be it known that I, FRANK K. LATHROP, a citizen of the United States, residing at Dayton, in the county of Montgomery and State of Ohio, have invented certain new and useful Improvements in Seeding-Machines, of which the following is a full, clear, and exact description, reference being had to the accompanying drawings, forming part of this specification.

My improvements relate to seeding-machines of the class intended for the planting of cotton and corn, and more particularly to sulky-planters for the planting of cotton, and it has especial relation to that certain novel construction and arrangement of parts to be hereinafter particularly pointed out and claimed, whereby a maximum adjustment of the shovels of the planter may be obtained; and it consists, essentially, of the introduction of a compound lever arrangement between the adjusting-lever and the drag-bars under which a very much larger vertical adjustment of the shovels may be obtained than under the ordinary construction.

It will be understood that especially in the planting of cotton, which it is customary to plant either in the ridges or on the level, sometimes it is desired to adjust the shovels so many inches below the level of the carrying-wheels, and at other times the shovels have to be adjusted many inches above the level of the carrying-wheels. With the ordinary adjusting-lever attached directly to the drag-bars it is not practicable to obtain the vertical adjustment desired, and it is to overcome this objection to the ordinary constructions to which my invention is directed.

In the drawings, Figure 1 is a top plan view of so much of the planter as will illustrate my improvements. Fig. 2 is a longitudinal sectional elevation illustrating my improvements. Fig. 3 is a detail section taken on the lines 3 3 of Fig. 1.

I have illustrated in the drawings only so much of the planter as may be necessary to explain my improvements and as applied to a sulky-planter of any of the well-known forms.

A is the carrying-axle, provided with the usual carrying-wheels.

B is a rectangular frame secured to the carrying-axle by clips $a$ $a$.

C C are the drag-bars, provided at their lower ends with the shovels D D, and bolted by their forward ends to the tongue E of the planter. The forward ends of the frame are connected with the drag-bars by the plates $b$ $b$ and pivoted thereto at $c$ $c$.

F is the seed-hopper, mounted on suitable cross-braces $d$ $d$, secured between the drag-bars, and this seed-hopper is provided with the usual seeding devices operated from the driving-axle A by shaft and gearing or in any other well-known way.

The method of actuating the seeding devices and of delivering the seed to the ground has not been illustrated, as any of the well-known constructions may be employed, and these form no part of my improvements. It will be also understood that the shovel or middle breaker for forming the furrow in which the seed is deposited is attached to the tongue in the usual way.

G is the seat-bar, provided at its upper end with the usual seat (not shown) for the driver and secured at the middle portion of the carrying-axle A by the clip $e$. This seat-bar is also braced by the brace-rods $f$, secured between the bar and the frame.

H is the adjusting-lever for raising and lowering the drag-bars and shovels and may be provided with the usual hand-latch which engages the teeth of the segment-rack L, bolted to the seat-bar G, by means of which the adjusting-lever is locked in any desired position. This adjusting-lever is of the bell-crank variety. The heel $g$, which is slotted to inclose the seat-bar G, is fulcrumed thereto by the pin $h$.

M M are connecting-levers pivoted on the pin $l$ to a forwardly-projecting lug on the clip $e$. The forward ends of these connecting-levers M M are provided with the slots $m$, through which slots the rod $n$ passes, and which rod is secured to the drag-bars C C, and by means of which the connecting-levers M M are coupled to the drag-bars. The outer ends of the connecting-levers are provided with a series of vertical openings $p$ $p$, and the rod $n$ is held in any desired position in the slots $m$ by the pins $r$. The forwardly-extending arm $s$ of the bell-crank adjusting-lever H is pivoted by the fork P to the levers M M, and this pivotal connection is about midway between the pivoted ends of the levers M M and the inner end of the slots $m\ m$.

It will be seen from the foregoing description that with the pins $r$ in the nearest holes of the connecting-levers M the drag-bars can be adjusted vertically about twice the throw of the outer end of the bell-crank adjusting-lever H and that when the pins $r$ are removed to the outermost holes in the connecting-levers the vertical adjustment of the drag-bars can be very much increased. The operator can therefore adjust the shovels at the height desired by moving the pins $r$, and he then locks the adjusting-lever in the desired position.

Having thus described my invention, what I claim, and desire to secure by Letters Patent, is—

1. In a seeding-machine, the combination, with the drag-bars, and an adjusting-lever, with means for locking said lever in any desired position, of an intermediate lever, with coupling therefor to the drag-bars and adjusting-lever, whereby the action of the adjusting-lever is compounded, substantially as shown and described.

2. In a seeding-machine, the combination, with the drag-bars, and an adjusting-lever, with means for locking said lever in any desired position, of an intermediate lever pivoted to the frame, coupling connection therefor to the adjusting-lever, and means for adjustably connecting the outer end of said intermediate lever to the drag-bars, substantially as shown and described.

3. In a seeding-machine, the combination, with the drag-bars, and a bell-crank adjusting-lever, with means for locking said lever in any desired position, of an intermediate lever pivoted to the frame, coupling connection therefor to the outer end of the bell-crank lever, said intermediate lever being slotted at its outer end with rod connecting the drag-bars passing through said slot and means for adjusting the rod in said slot for changing the compound leverage, substantially as shown and described.

FRANK K. LATHROP.

Witnesses:
J. N. LYLE,
H. S. JOHNSON.